Jan. 18, 1966  A. B. STILES  3,230,182
METHOD OF PREPARING A CATALYST COMPOSITION CONSISTING
OF MANGANESE OXIDE-COATED ALUMINA WITH NICKEL
OR COBALT CHROMITES AND THE PRODUCT THEREOF
Filed April 13, 1962

$Al_2O_3$

ADD $Mn(NO_3)_2$
CALCINE AT 600°C

O
Mn
Al

ADD $NiOOH NH_4CrO_4$
$Th(NO_3)_4 \cdot 4H_2O$
CALCINE AT 400°C $Al_2O_3$ $ThO_2$ $NiO \cdot NiCr_2O_4$ INVENTOR
ALVIN B. STILES
BY Albert B. Griggs
ATTORNEY United States Patent Office 3,230,182
Patented Jan. 18, 1966

3,230,182
METHOD OF PREPARING A CATALYST COMPOSITION CONSISTING OF MANGANESE OXIDE-COATED ALUMINA WITH NICKEL OR COBALT CHROMITES AND THE PRODUCT THEREOF
Alvin B. Stiles, Wilmington, Del., assignor to E. I. du Pont de Nemours and Company, Wilmington, Del., a corporation of Delaware
Filed Apr. 13, 1962, Ser. No. 187,396
5 Claims. (Cl. 252—465)

This invention relates to catalysts and is more particularly directed to a nickel or cobalt chromite catalyst carried upon alumina which is coated with and which carries manganese oxide on its micropores. The invention is further directed to processes for making such catalysts.

If nickel or cobalt chromite is applied to an activated alumina carrier an effective catalyst is produced but it is sensitive to thermal deactivation. At temperatures of about 1000° C. the surface area of the catalyst drops to a very low figure of the order of $5M^2/g.$, or even less, with an attendant loss in catalytic efficiency.

According to the present invention an alumina carrier is first treated with a manganese compound and calcined whereupon manganese oxide forms a coating upon the alumina and reinforces the alumina structure in such a fashion that when the catalyst is heated to elevated temperatures there is a smaller loss in surface area. If nickel or cobalt chromites are thereafter supported upon the treated alumina there is little if any reaction between them and the alumina. Thus in the case of nickel chromite the catalyst remains brown and does not develop the green coloration typical of the reaction of nickel with alumina. Similarly cobalt would give a blue color with alumina except for the presence of the manganese.

If instead of first treating alumina with a manganese compound the manganese compound is added together with the nickel or cobalt chromites there is nevertheless an immediate reaction, upon heating, between the alumina and the chromites present. Thus with nickel chromite there is an immediate development of a typical green color. The nickel reacts with an alumina carrier just as if the manganese were not present.

Figure 1:
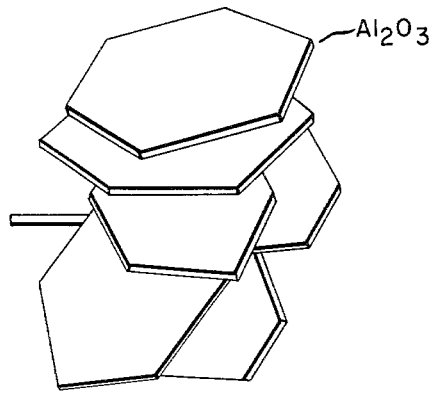
FIGURE 1 illustrates an alumina catalyst carrier.

Processes of the invention, and specifically the process of Example 1, are illustrated in the drawings. In FIGURE 1 there is shown as a series of hexagons the commonly supposed structure of activated alumina. As shown, gamma alumina is represented in an idealized form with crystallites of the gamma alumina having generally a hexagonal form randomly arranged like jackstraws. The crystallites are thought of as held together, but not closely spaced, by van der Waals forces. The high nitrogen surface area of such alumina is at least in part thought to be attributable to the spaces between the crystallites and is probably in part attributable also to voids and defects in the crystal lattice structure.

Figure 2:
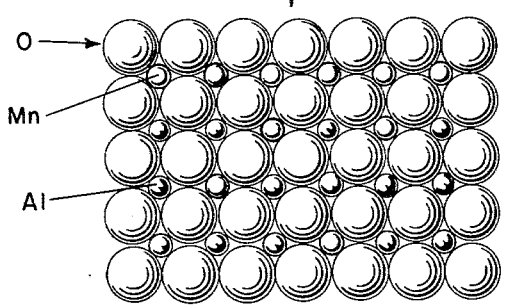
FIGURE 2 is a representation in detail of the supposed structure of the alumina and showing manganese oxide coated thereupon.

In FIGURE 2 there is illustrated in great detail the molecular structure of the alumina of FIGURE 1 following treatment with manganese nitrate and calcination. This shows a coating of manganese oxide which according to the invention effectively prevents reaction between nickel and the alumina surface. The coating is on the exterior surfaces and extends into the micropores. The manganese is illustrated as shaded with a semicircle and the aluminum as smaller and more heavily shaded. The oxygens are represented, as is customary, as spheres. The manganese and oxygen coat the aluminum oxide lattice, fully satisfying the valence bonds which would otherwise be free for reaction with nickel. It will be observed that in the figure some manganese atoms are shown dispersed within the alumina lattice. It is not clear that this happens but diffusion of metals to available sites is a common phenomenon and this probably occurs.

The manganese oxide by locating as illustrated reinforces the structure of FIGURE 1 so that upon heating it does not lose surface area to the same extent that it would without the manganese oxide. Whatever the mechanism and location of the manganese oxide with respect to the alumina crystal lattice it prevents the alumina losing as much surface area as it would otherwise lose and it effectively prevents any considerable reaction between nickel or cobalt and the alumina.

Figure 3:
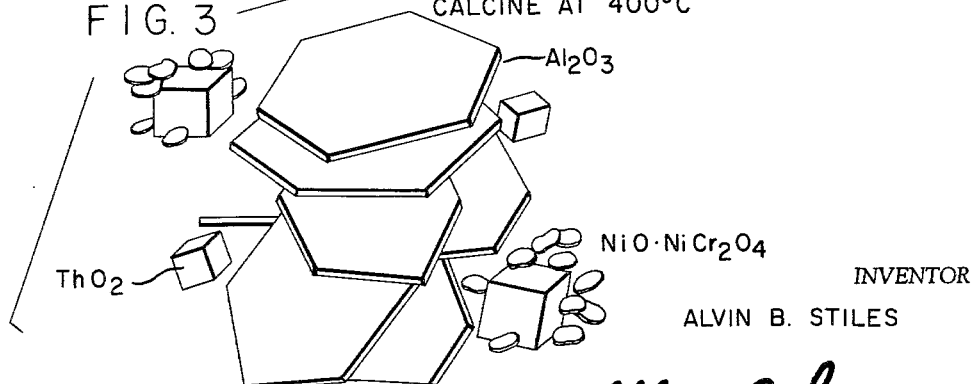
FIGURE 3 illustrates the finished catalyst.

In FIGURE 3 there is illustrated the catalyst of the invention which results, as shown, by adding basic nickel chromate and thorium nitrate to the product of FIGURE 2 and calcining. In FIGURE 3 the alumina carrier is shown as in FIGURE 1 closely associated with nickel chromite and thoria. The thoria is represented as cubes and the nickel chromite is represented as a cube of nickel chromite surrounded by small flat particles of nickel oxide. No effort is made to illustrate the presence of the manganese compound in FIGURE 3.

Considering the process in somewhat more detail the alumina employed can be any of the commercially available forms of alumina used as catalyst supports. These are usually called activated aluminas and are essentially pure $Al_2O_3$. Some aluminas contain small amounts of sodium.

The particle size of the alumina is comparatively indifferent. If the particle size is very small the catalyts can be used in that form or can be pelleted. If present as larger particles the particles can be used as such or, after grinding, can be pelleted. The surface area of the alumina will ordinarily run about 60 to $400M^2/g$. Typical activated aluminas of preferred character have a nitrogen surface area of about $200M^2/g$.

According to processes of the invention the manganese is introduced as the nitrate or another water-soluble salt. There may be used manganese sulfate, chloride, acetate, sulfamate, or hydroxyacetate. The manganese salts can be introduced as aqueous solutions containing from about 0.1 N up to saturation. It is ordinarily desirable to use a solution containing a fairly large amount of the manganese salt, say, around 1 N.

The amount of the manganese compound left upon the alumina should be sufficient to provide from about 1 to 12% of manganese oxide after calcination.

After the manganese compound has been applied to the alumina the catalyst is dried and is then calcined at a temperature sufficient to decompose the manganese salt and leave manganese oxide. After calcination the manganese may be present as $Mn_2O_3$ and may possibly be present at least in part as $Mn_3O_4$. Calcination is effected in the presence of oxygen and it is difficult to know precisely the valence state.

The nickel and cobalt can be added to the cataylst as aqueous solutions of the basic chromate. The solutions can run from about $2/10$ normal to saturation. It is preferred to use around $6/10$ normal solution of one of these chromates or of a mixture of them.

The amount of nickel and cobalt chromites upon the alumina can vary widely but in general will range between about 4 and 18% of one of these or of the two combined. If more is used the corresponding increase in activity is hardly worth the additional expense and if less is used the volume of catalyst becomes too high. Additionally if too large an amount of the chromite is used there is a tendency for the catalyst particles to agglomerate and to lose activity.

At the same time that the chromate is added one can add thoria as an interspersant. The thoria can be added as the nitrate or another soluble salt such as the soluble salts of manganese already mentioned. It can be added as a sol. The thoria or thorium salt is added in the amount of about 1/10 of a percent to 5% by weight of the chromates added and in the same solution. The final amount of thoria to leave in the catalyst is small and will range from about one-hundredth of a percent to 1% by weight based upon the weight of catalyst.

After immersion in the solution as described the catalyst is drained, dried, and calcined at a temperature sufficient to decompose the basic chromate, and sufficient also to decompose the thorium compound if there is one present.

The calcined products as thus prepared can be pelleted in conventional manner or can be used in the form in which they are obtained.

In order that the invention may be better understood reference should be had to the following illustrative examples.

*Example 1*

(1) 1000 parts by weight of gamma alumina in the form of 8 to 14 mesh granules and having a surface area of 200 $M^2$/g. are immersed in an aqueous solution containing 140 parts by weight of manganese nitrate $Mn(NO_3)_2$, anhydrous, dissolved in 335 parts by weight of distilled water.

(2) Excess liquid is drained from the activated alumina which has been impregnated and the moist granules are calcined at 600° C. for three hours.

(3) After cooling, the granules are immersed in 1000 parts by weight of an aqueous solution containing 174 parts by weight of nickel nitrate hexahydrate and 3.6 parts by weight of thorium nitrate, $Th(NO_3)_4 \cdot 4H_2O$.

(4) Supernatant liquid is drained from the granules and they are then immersed in 1000 parts by weight of an aqueous solution containing 60 parts by weight of chromic oxide, $CrO_3$, and 35 parts by weight of $NH_3$.

(5) Additional aqueous ammonium is added to the slurry to complete the precipitation of the basic nickel chromate.

(6) The slurry is allowed to stand with slight agitation for 15 minutes. The supernatant liquid is drained from the granules.

(7) The granules are calcined at 400° C. for three hours.

The cataylst as thus prepared is particularly useful for the treatment of combustion gases from hydrocarbon fuels such as exhaust gases from automobiles. The catalysts are particularly effective for the oxidation of the hydrocarbon and olefinic components which are present as products of partial combustion. The catalysts can also be used for the oxidation of off-gases from chemical operations. They can likewise be used for completing combustion of the gases from space heaters and fuel fired devices generally. They can be used for converting fuels thus to radiate heat energy. The catalysts are particularly effective when a very active catalyst which promotes complete oxidation is wanted.

*Example 2*

A catalyst is made exactly as in Example 1 except that in item 3 the thorium compound is omitted. The resulting catalyst is useful for the purposes recited in Example 1.

*Example 3*

The procedure of Example 2 is followed except that in item 3, 174 parts by weight of cobalt nitrate hexahydrate is used instead of the same amount of the nickel nitrate used in Example 1.

The cataylst produced can be used for the purposes recited in Example 1.

In the foregoing example instead of using manganese nitrate the same weight of manganese chloride, sulfate, carbonate, acetate, hydroxyacetate, sulfamate, and other soluble salts mentioned above can be used. Similarly the thorium nitrate can be replaced by an equal weight of thorium chloride, sulfate, or other soluble salts as previously described.

*Example 4*

A catalyst is prepared as in Example 1 but in item 1 for the alumina there is employed instead eta alumina having a surface area of 160$M^2$/g. and being in the form of extruded cylinders 1/16 of an inch in diameter and 1/8 inch long.

In item 3, 87 parts by weight of nickel nitrate hexahydrate and 87 parts by weight of cobalt nitrate hexahydrate are used instead of the quantity of nickel nitrate shown in Example 1.

A catalyst as thus prepared is useful for the purposes recited in Example 1.

The claims are:

1. A catalyst selected from the group consisting of nickel chromite and cobalt chromite carried upon alumina which has manganese oxide as a coating upon its surface and within its micropores stabilizing the alumina so that its nitrogen surface area does not as greatly diminish upon heating to temperatures as high as 1000° C.

2. A catalyst selected from the group consisting of nickel and cobalt chromites supported upon alumina with manganese oxide as a coating upon its surfaces and within its micropores, there being 4 to 18% by weight of the chromite based upon the weight of alumina and 1 to 12% by weight of the manganese oxide based upon the weight of alumina.

3. A catalyst selected from the group consisting of nickel and cobalt chromites supported upon alumina with manganese oxide as a coating upon its surfaces and within its micropores, there being 4 to 18% by weight of the chromite based upon the weight of alumina and 1 to 12% by weight of the manganese oxide based upon the weight of alumina, there being additionally present from 0.01 to 1% by weight of thoria based upon the weight of alumina.

4. In a process for preparing a chromite catalyst, adding a soluble manganese salt to alumina in the proportion of 1 to 12% by weight based on the alumina of manganese computed as oxide, calcining to decompose the manganese salt, adding from 4 to 18% by weight based upon the weight of alumina and computed as chromite of a chromate selected from the groups consisting of nickel and cobalt basic chromates and calcining to decompose the basic chromate to a chromite.

5. In a process for preparing a chromite catalyst, adding a soluble manganese salt to alumina in the proportion of 1 to 12% by weight based on the alumina of manganese computed as oxide, calcining to decompose the manganese salt, adding 0.01 to 1% by weight based upon the weight of alumina of a soluble thorium salt, computed as thoria, along with from 4 to 18% by weight based upon the weight of alumina and computed as chromite of a chromate selected from the group consisting of nickel and cobalt basic chromates and calcining to decompose the basic chromate to a chromite.

References Cited by the Examiner

UNITED STATES PATENTS

| | | | |
|---|---|---|---|
| 2,418,899 | 4/1947 | Pevere et al. | 252—471 X |
| 2,435,551 | 2/1948 | Black | 252—470 X |
| 2,818,451 | 12/1957 | Myers | 252—471 X |

MAURICE A. BRINDISI, *Primary Examiner.*